United States Patent Office 3,492,325
Patented Jan. 27, 1970

3,492,325
PRODUCTION OF α-HYDROXY ACIDS AND ESTERS
James E. Thompson, Springfield Township, Hamilton, County, Ohio, assignor to The Procter & Gamble Company, Cincinnati, Ohio, a corporation of Ohio
No Drawing. Filed Mar. 24, 1967, Ser. No. 625,626
Int. Cl. C07c *59/04, 69/66;* C07d *15/16*
U.S. Cl. 260—410.9                12 Claims

ABSTRACT OF THE DISCLOSURE

α-Keto acetals are converted into α-hydroxy acids and esters in the presence of a Lewis acid catalyst and an inert solvent and water to form a reaction mixture. The reaction mixture is heated with provision for reflux until the conversion is complete. α-Hydroxy acids and esters are recovered from the reaction mixture by conventional methods.

BACKGROUND OF THE INVENTION

This invention relates to the production of α-hydroxy acids and esters. More particularly, the invention comprises processes whereby α-keto acetals are converted into α-hydroxy acids and esters in an acid catalyzed reaction wherein a Lewis acid is used as the catalyst.

Base catalyzed reactions for the conversion of α-keto compounds into their corresponding α-hydroxy compounds are known in the art. An example of one such base catalyzed reaction for the conversion of α-keto aldehydes into α-hydroxy carboxylates in a strongly basic solution was reported in Morrison and Boyd, Organic Chemistry, page 643, Allyn and Bacon Inc. (first edition, 1959). It does not appear, however, that an uncomplicated acid catalyzed process for the conversion of an α-keto compound into an α-hydroxy acid or ester has been reported in the chemical literature.

Acid catalyzed processes have decided advantages over the base catalyzed reactions previously available. For example, they can be carried out under relatively mild reaction conditions whereas the base catalyzed reactions require strong alkaline conditions and excess heat. Because of this ability to be carried out under relatively mild reaction conditions, the present acid catalyzed process is advantageous in the synthesis of α-hydroxy acids and esters which are sensitive to decomposition under strongly alkaline conditions. These α-hydroxy acid and ester products have known utility; for example, they can be utilized as polymer modifiers, intermediates for preparing oil thickening products, emulsifiers and lubricant additive, as more fully described hereinafter.

It is, therefore, an object of this invention to provide a novel process for the production of α-hydroxy acids and esters.

It is a further object of this invention to provide a process for the conversion of α-keto acetals into α-hydroxy acids and esters.

Other objects and advantages will be apparent from the following description of the present process.

SUMMARY OF THE INVENTION

In general, the foregoing objects are achieved by a process wherein the starting material is an α-keto acetal having the general formula:

$$R-\overset{O}{\underset{\|}{C}}-\underset{\underset{OR'}{|}}{\overset{OR'}{\underset{|}{C}}}-R''$$

wherein R is selected from the group consisting of straight chain alkyl, branched chain alkyl, alkenyl, aryl and aralkyl hydrocarbon groups having 1 to about 22 carbon atoms; each R' is selected from the group consisting of straight chain alkyl, aryl and aralkyl hydrocarbon groups having 1 to about 6 carbon atoms and R'' is selected from the group consisting of hydrogen and straight chain alkyl, branched chain alkyl and aryl hydrocarbon groups having 1 to about 22 carbon atoms.

The present acid catalyzed conversion of α-keto acetals into α-hydroxy acids and esters is effected with a Lewis acid catalyst in the presence of an inert solvent in water. The reaction is carried out by heating the reaction mixture comprised of the α-keto acetal starting material, the Lewis acid catalyst, the inert solvent and the water to a temperature of about 0° C. to about 200° C. Provision for reflux in the form of a condenser to return escaping vapors is provided; otherwise the reaction conditions would cause solvent loss by evaporation during the reaction. Preferably, the reaction is carried out at a temperature of about 60° C. to about 100° C. The reaction can be carried out during a period of about 1 hour to about 24 hours until the reaction is complete. In general, the reaction proceeds fairly rapidly, and reaction times of about 1 to about 2 hours are preferred.

The reaction is normally carried out at atmospheric pressure; however, should a reaction appear to be sluggish, higher pressures can be used in order to raise the temperature and allow the reaction to proceed.

The general reaction of the present invention is illustrated by the equation below:

$$R-\overset{O}{\underset{\|}{C}}-\underset{\underset{OR'}{|}}{\overset{OR'}{\underset{|}{C}}}-R'' + H_2O \xrightarrow[\Delta]{\text{Lewis acid solvent}}$$

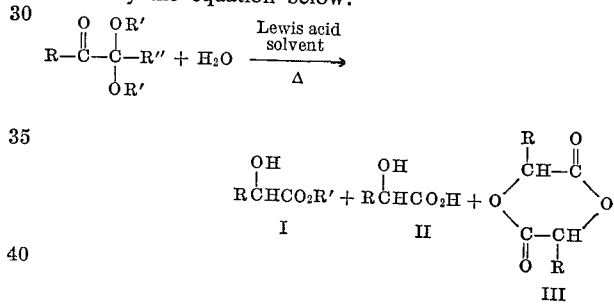

The principal products are the α-hydroxy ester (I), the α-hydroxy acid (II) and the lactide (III) corresponding to the α-keto acetal starting material. Either the α-hydroxy ester (I) product or the α-hydroxy acid (II) product can be recovered by conventional means from the reaction mixture illustrated in the above general equation. When R is an alkyl group, the ester and acid products can be utilized as oil soluble metal complexing agents, as emulsifier agents in cake batters, as plasticizers for vinyl polymers, as lubricant additives and as intermediates in the synthesis of oil thickeners for use as ointment bases. When R is aryl or aralkyl, the above ester and acid products can be utilized as corrosion inhibitors in lubricants, as luster enhancing additives in copper and nickel plating baths, as components in insect repellants, as intermediates in the synthesis of bactericides and fungicides, as polymerization modifiers and as perfume compounds.

As an example of a general procedure for recovering the ester product subsequent to reaction, 10 volumes of methanol containing 1% by weight of a mineral acid such as sulfuric acid can be added to dissolve the reaction mixture. The resulting solution is heated with provision for reflux for one hour to effect methanolysis. The substitution of other alcohols, for example propyl alcohol, butyl alcohol and ethyl alcohol, results in the recovery of their corresponding ester. The solution is then cooled and poured into an equal volume of water and thereafter extracted with a suitable solvent. Suitable solvents for such an extraction include ether, chloroform, benzene, hexane and carbon tetrachloride. The solvent extract is then neutralized with a weak base, for example, sodium bicarbonate or sodium carbonate and dried over anhydrous magnesium sulfate. Evaporation of the solvent leads to recovery of the α-hydroxy ester (I) as a residue.

If the α-hydroxy acid (II) product is desired, the procedure is the same as for the recovery of the α-hydroxy ester above with the two exceptions that water is substituted for the alcohol and the solvent extract is not neutralized with a weak base prior to solvent evaporation for product recovery.

In carrying out the process of the present invention, an α-keto acetal wherein R'' is hydrogen is preferable as a starting material to an α-keto acetal wherein R'' is a hydrocarbon group. α-Keto acetals wherein R'' is hydrogen are more readily available and result in an improved product yield. The improved yield appears to be due to a lesser tendency of such α-keto acetals to enter into acid catalyzed side reactions than is the case where R'' is a hydrocarbon group.

As stated heretofore, the α-keto acetal, the Lewis acid catalyst and water are combined in the presence of an inert and, preferably, a polar, water miscible solvent, for example dioxane, to form a reaction mixture. Other suitable polar, water miscible solvents are acetonitrile, ethylene glycol dimethyl ether (monoglyme), diethylene glycol dimethyl ether (diglyme), dimethylformamide, N,N-dimethylacetamide and acetone. The use of a polar, water immiscible solvent, for example diether ether, or a non-polar, water immiscible solvent, for example hexane, is also possible. The use of water immiscible solvents will, however, result in decreased product yields. The same process and recovery procedures are involved whether the solvent is water miscible or immiscible; however, longer reaction times are necessary when water immiscible solvents are employed.

As stated above, Lewis acid catalysts are used in the present reaction process. A Lewis acid is defined as a substance which can accept a lone pair of electrons from another substance to complete the electron ring system of one of its own atoms. Examples of Lewis acids which can be utilized as the catalyst in the process of this invention include $SnCl_4$, $AlCl_3$, $FeCl_3$, $TiCl_4$, $BF_3 \cdot (C_2H_5)_2O$ and $H_2SO_4$.

The Lewis acid catalysts, $SnCl_4$ for example, are employed in amounts ranging from catalytic amounts up to equimolar amounts with regard to the moles of α-keto acetal starting material. With small amounts of catalyst, increased reaction times will improve the yield. With large amounts of catalyst, however, the yield decreases as the reaction time increases beyond two hours. The use of greater than equimolar amounts of Lewis acid catalyst on the basis of the moles of α-keto acetal starting material results in a waste of the catalyst. Anhydrous $SnCl_4$ has been found to be a preferred Lewis acid catalyst. When anhydrous $SnCl_4$, instead of hydrated $SnCl_4$, is used as the catalyst, improved yields are obtained.

Yields are improved by the addition of water subsequent to the combining of an anhydrous catalyst, particularly an anhydrous $SnCl_4$ catalyst, with an α-keto acetal starting material to form a reaction mixture. The addition of water subsequent to the addition of a hydrated catalyst tends to decrease yields. Although applicant does not intend that this invention be bound by such explanation, it is believed that the increased yields in the case of subsequent water addition are due to the fact that more favorable conditions exist for unwanted competing reactions when water is present initially; whereas conditions are less favorable for these competing reactions when water is added subsequently.

Although the amount of water added to the reaction can be varied, the mechanism of the reaction requires at least one mole of water for every mole of α-keto acetal that is converted into the corresponding α-hydroxy acid or ester. The reaction has been carried out with about 1 mole of water to about 18 moles of water per mole of α-keto acetal starting material present, and the necessary water for the reaction can be supplied by a hydrated catalyst. The reaction will proceed with only trace amounts of water present, but in such a case α-keto acetal starting material will be wasted because the reaction will cease after the water is consumed.

Preferable amounts of water for use in the present process have been found to be about 4 to about 10, and preferably about 7, moles of water per mole of α-keto acetal starting material. Additional water present, over the 1 mole of water per mole of α-keto acetal starting material necessary to satisfy stoichiometric requirements and up to about 17 additional moles of water per mole of α-keto acetal starting material, serves to limit the formation of degradation products during the reaction.

The following examples will illustrate in detail the manner in which the invention may be practiced. It will be understood, however, that the invention is not confined to the specific limitations set forth in the individual examples, but rather to the scope of the appended claims.

PREFERRED EMBODIMENTS

Example I

A one liter, three necked flask equipped with a stirrer, a reflux condenser and a rubber serum cap was used as a reactor. Prior to the addition of water by hypodermic syringe injection through the serum cap, the flask was protected from atmospheric moisture by means of a drying tube filled with anhydrous calcium sulfate. A solution of 30.0 grams (0.13 mole) of 1,1-dimethoxy-2-oxoundecane in 600 ml. of dried dioxane, as a polar, water miscible solvent, was prepared in the one liter, three necked flask, and to this solution were added rapidly and in succession 34.0 grams (0.13 mole) of anhydrous stannic chloride and 16.4 grams (0.91 mole–7 moles per mole of 1,1-dimethoxy-2-oxoundecane) of water to form a reaction mixture.

The resulting reaction mixture was heated to and maintained at about 100° C., with provision for reflux by means of the reflux condenser, during a two hour period to effect the conversion reaction. The reaction mixture was then cooled and poured into an equal volume of water, and the resulting reaction mixture-water solution was extracted three times with ether. After the ether extractions and a final extraction with chloroform, the combined chloroform and ether extracts were dried over anhydrous magnesium sulfate prior to evaporating the solvents, and the desolventized extract was neutralized with a sodium carbonate solution. A methanolysis process was then carried out on the neutralized extract and 23.3 grams of methyl 2-hydroxy-undecanoate were recovered. This weight of product was equivalent to an 83% theoretical yield based on the weight of 1,1-dimethoxy-2-oxoundecane starting material entering into the reaction. Methyl 2-hydroxy-undecanoate can be used as a plasticizing agent for vinyl polymers.

When 5,5-diethoxy-6-oxotetracosane, 2-2-dimethoxy-3-oxohexane, 1,1-dimehoxy-2-oxopentane, 1,1-dimethoxy-2-oxo-3-nonene, and 1,1-dihydroxy-2-oxoundecane are substituted on a molar basis for the 1,1-dimethoxy-2-oxoundecane starting material in the process of Example I, the α-hydroxy esters, methyl 1-butyl-1-hydroxy-decanoate, methyl 1-hydroxy-1-methylpentanoate, methyl 1-hydroxypentanoate, methyl - 2 - hydroxy - 3 - nonenoate, and methyl 2-hydroxyundecanoate, are produced. The second and third of the above α-hydroxy ester products can be used as perfume compounds, while the other α-hydroxy ester products find use as plasticizing agents for vinyl polymers.

Examples II–VII

Additional runs of the process of Example I were carried out with the exception that Lewis acids other than $SnCl_4$ were used. The reaction times and amounts of Lewis acid used were also varied. The results of these additional runs are summarized as Examples II-VII in the following table:

| Example | Lewis acid | Moles Lewis acid per mole α-keto acetal | Reaction time in hours | Percent of theoretical yield of methyl 2-hydroxy-undecanoate |
|---|---|---|---|---|
| II | Anhydrous TiCl₄ | 1.0 | 2 | 37 |
| III | Anhydrous AlCl₃ | 1.0 | 2 | 33 |
| IV | Anhydrous FeCl₃ | 1.0 | 2 | 12 |
| V | BF₃·(C₂H₅)₂O | 1.0 | 2 | 3 |
| VI | 98% H₂SO₄ | 3.7 | 2 | 3 |
| VII | 20% H₂SO₄ | 0.47 | 2 | 3 |

Example VIII

The use of hexane to replace the dried dioxane used as the solvent in the process of Example I will result in a yield of 48% of methyl 2-hydroxyundecanoate.

If acetonitrile, ethylene glycol dimethyl ether (monoglyme), diethylene glycol dimethyl ether (diglyme), dimethylformamide, N,N-dimethylacetamide or acetone is substituted on an equal volume basis for dried dioxane as the polar, water miscible solvent in the process of Example I, substantially equivalent results will be obtained in that a similar yield of methyl 2-hydroxyundecanoate will be obtained.

Example IX

A one liter, three necked flask equipped with a stirrer, a reflux condenser and a rubber serum cap was used as a reactor. Prior to the addition of water by hypodermic syringe injection through the serum cap, the flask was protected from atmospheric moisture by means of a drying tube filled with anhydrous calcium sulfate. A solution of 2.0 grams (0.0078 mole) of benzil α,α-dimethylketal in 20 ml. of dried dioxane, as a polar, water miscible solvent, was prepared in the one liter, three necked flask, and to this solution were added rapidly and in succession 5.97 grams (0.023 mole) of anhydrous stannic chloride and 0.99 gram (0.055 mole) of water to form a reaction mixture.

The resulting reaction mixture was heated to and maintained at about 100° C., with provision for reflux by means of the reflux condenser, during a two hour period to effect the conversion reaction. The reaction mixture was then cooled and poured into an equal volume of water and the resulting reaction mixture-water solution was then extracted three times with ether. After the ether extractions and a final chloroform extraction, the combined chloroform and ether extracts were dried over anhydrous magnesium sulfate prior to evaporating the solvents, and the desolventized extract was neutralized with a sodium carbonate solution. A methanolysis process was then carried out on the neutralized extract and analysis of the resulting product by thin layer chromatography showed an 18–22% yield of methyl benzilate was obtained. The above ester product can be utilized as an intermediate in the synthesis of anticonvulsive agents such as benzil diethylaminoethyl ester hydrochloride by interesterification with N,N-diethylaminoethyl alcohol.

When one of 1,1-di-isopropoxy-2-oxo-2-phenylethane, 1,1-dimethoxy-2-oxo-4-methylpentane, 1,1-dimethoxy-2-oxo-2-p-methoxyphenylethane, dimethylketal of 2,3-dioxopentane and dimethylketal of biacetyl are substituted on an equimolar basis for benzil α,α-dimethylketal in the process of Example IX, substantially equivalent results are obtained in that their corresponding α-hydroxy esters will be recovered.

If the process of Example IX is carried out without neutralization of the desolventized extract with sodium carbonate and subsequent methanolysis, benzilic acid, the α-hydroxy acid corresponding to the benzil α,α-dimethylketal starting material will be obtained.

In addition to the preferred embodiments described herein, other arrangements and variations within the spirit of the invention and the scope of the appended claims will occur to those skilled in the art.

There is claimed:

1. The process for the production of α-hydroxy acids and esters by conversion of an α-keto acetal having the general formula:

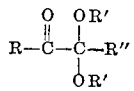

wherein R is selected from the group consisting of straight chain alkyl, branched chain alkyl, alkenyl, aryl and aralkyl hydrocarbon groups having 1 to about 22 carbon atoms; each R' is selected from the group consisting of straight chain alkyl, aryl and aralkyl hydrocarbon groups having 1 to about 6 carbon atoms and R'' is selected from the group consisting of hydrogen and straight chain alkyl, branched chain alkyl and aryl hydrocarbon groups having 1 to about 22 carbon atoms, which process comprises the successive steps of: (1) combining said α-keto acetal with a Lewis acid catalyst in the presence of an inert solvent, (2) adding to the mixture about 1 mole to about 18 moles of water per mole of α-keto acetal to form a reaction mixture and (3) heating said reaction mixture to effect the conversion reaction.

2. The process of claim 1 wherein the α-keto acetal in step (1) is 1,1-dimethoxy-2-oxoundecane.

3. The process of claim 1 wherein the α-keto acetal in step (1) is benzil α,α-dimethyl ketal.

4. The process of claim 1 wherein the inert solvent in step (1) is dioxane.

5. The process of claim 1 wherein the Lewis acid catalyst in step (1) is selected from the group consisting of hydrated and anhydrous SnCl₄, TiCl₄, AlCl₃ and FeCl₃.

6. The process of claim 1 wherein the Lewis acid catalyst in step (1) is anhydrous SnCl₄.

7. The process of claim 1 wherein the amount of water added to the mixture in step (2) is about 4 to about 10 moles per mole of α-keto acetal.

8. The process of claim 1 wherein the water addition in step (2) is about 7 moles per mole of α-keto acetal.

9. The process of claim 1 wherein the reaction mixture in step (3) is heated to about 0° C. to about 200° C.

10. The process of claim 1 wherein the reaction mixture in step (3) is heated to about 60° C. to about 100° C.

11. The process of claim 1 wherein the reaction mixture in step (3) is heated for about 1 to about 24 hours.

12. The process of claim 1 wherein the reaction mixture in step (3) is heated for about 1 hour to about 2 hours.

References Cited

Morrison et al., Organic Chemistry, 1962, p. 643.
Fieser et al., Organic Chemistry, 3rd ed., 1962, p. 215.

LORRAINE A. WEINBERGER, Primary Examiner

R.S. WEISSBERG, Assistant Examiner

U.S. Cl. X.R.

260—340.2, 413, 473, 484, 520, 521, 535